United States Patent
Wilczewski

[11] 3,854,562
[45] Dec. 17, 1974

[54] ELECTROMAGNETIC CLUTCH
[75] Inventor: Robert Hugh Wilczewski, Roselle, Ill.
[73] Assignee: Victor Comptometer Corporation, Chicago, Ill.
[22] Filed: Aug. 15, 1973
[21] Appl. No.: 388,454

[52] U.S. Cl. ............................................. 192/84 C
[51] Int. Cl. ............................................. F16d 27/10
[58] Field of Search ................................... 192/84 C

[56] References Cited
UNITED STATES PATENTS

| | | | |
|---|---|---|---|
| 3,325,760 | 6/1967 | Bernard | 192/84 C X |
| 3,381,784 | 5/1968 | Miller et al. | 192/84 C X |
| 3,381,785 | 5/1968 | Mendenhall | 192/84 C X |
| 3,743,068 | 7/1973 | Westervelt et al. | 192/84 C |

*Primary Examiner*—Allan D. Herrmann
*Attorney, Agent, or Firm*—Davis, McCaleb & Lucas

[57] ABSTRACT

A simplified compact electromagnetic clutch comprising a stationary field, a rotor and an armature, the field is a hollow cylindrical housing of magnetic material with inner and outer peripheral walls defining an annular recess to receive a plastic bobbin having a toroidal coil and a tubular offset extension through which the coil leads extend and which cooperates with a receiving aperture in the housing to extend therethrough as a lead wire strain relief and an anchor to prevent rotation of the field. The rotor comprises a hollow cylinder of magnetic material with a radial flange at one end, an outer collar, and a thin-walled, injection-molded, connecting portion of acetal homopolymer securing the cylinder and collar together and providing both radially and axially extending bearing surfaces for contact with the field housing which is retained on the rotor assembly by a snap ring. The rotor is mounted on a supporting shaft by press fitting the same onto a knurled portion of the shaft, and the armature is a disc of magnetic material having a square bore axially slidable on a square hub of a drive gear rotatably mounted on the supporting shaft.

11 Claims, 2 Drawing Figures 3,854,562

ELECTROMAGNETIC CLUTCH

BACKGROUND OF THE INVENTION

1. Field of the Invention

This invention relates generally to rotatable magnetic drives, and more particularly to frictionally engageable electromagnetic clutches.

2. Description of the Prior Art

Magnetic clutches generally are expensive, largely because of the number of parts employed and the costs of assembly. As an example, U.S. Pat. No. 3,055,475 discloses an electromagnetic clutch having a stationary coil and a rotor with inner and outer annular portions comprising coil-embracing pole pieces which requires numerous connecting parts and ball bearing mounting of the rotor and constitutes a relatively bulky construction. U.S. Pat. No. 3,162,285 provides a somewhat more compact electromagnetic clutch by using cured epoxy resin to encapsulate the coil, but it requires slip rings, or the like, to supply current to such rotating coil, in addition to the numerous connecting parts and ball bearings.

SUMMARY OF THE INVENTION

The present invention provides a very simplified electromagnetic clutch which effects outstanding savings in costs of manufacturing the parts and assembling the same, while assuring highly efficient and long lived operation, by making it of three basic components, a stationary field, a rotor and an armature. The field comprises a hollow cylindrical housing of magnetic material having a bore and concentric inner and outer peripheral walls defining an annular recess closed at its outer end by a connecting end wall and open at its inner end to receive a plastic coil bobbin having a substantially toroidal coil wound thereon. The outer surface of the inner peripheral wall of that housing may have a circular groove for receiving an annular rib in the bore of the bobbin as a means to retain the coil in the housing, and the housing end wall has an aperture for accommodating a tubular offset extension of the bobbin through which the coil leads extend and which functions as a lead wire strain relief and, with a stationary frame member, as an anchor to prevent rotation of the field. The rotor comprises a hollow cylinder of magnetic material with a radial flange at one end, an outer collar having an axially outer portion aligned with that flange and an axially inner portion adapted to overlie the inner reduced end of the field housing, and a thin-walled, injection-molded, connecting portion of non-magnetic material securing the cylinder and collar together and providing both radially and axially extending bearing surfaces for contact with the field housing. The field housing is retained on the rotor assembly by a snap ring, and the rotor is mounted on a supporting shaft, preferably by press fitting the same onto a knurled portion of the shaft. The armature is a disc of magnetic material having a non-circular bore slidable on a hub of similar outer shape on a drive gear, or the like, rotatably mounted on the supporting shaft.

In the drawings:

FIG. 1 is a longitudinal section taken axially through an electromagnetic clutch embodying the invention substantially on the line 1—1 of FIG. 2; and FIG. 2 is a transverse sectional view taken substantially on the line 2—2 of FIG. 1.

DESCRIPTION OF THE PREFERRED EMBODIMENT

Figure 1:
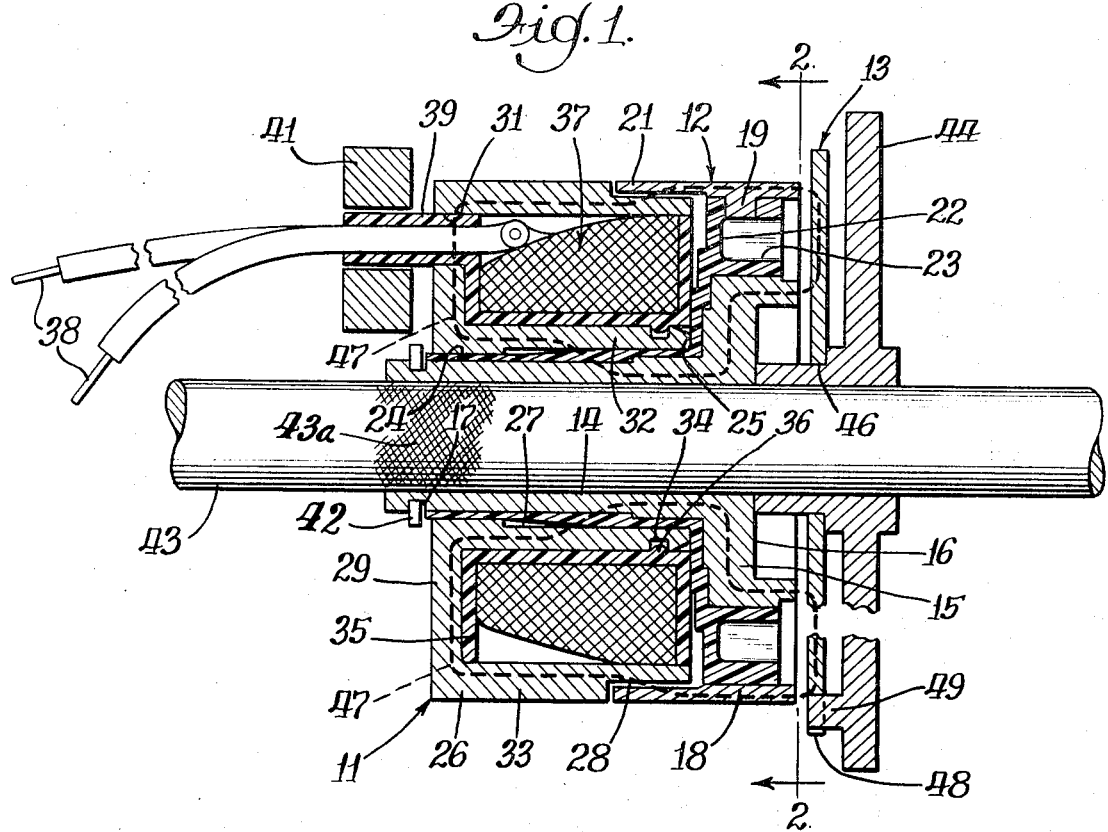
Figure 2:
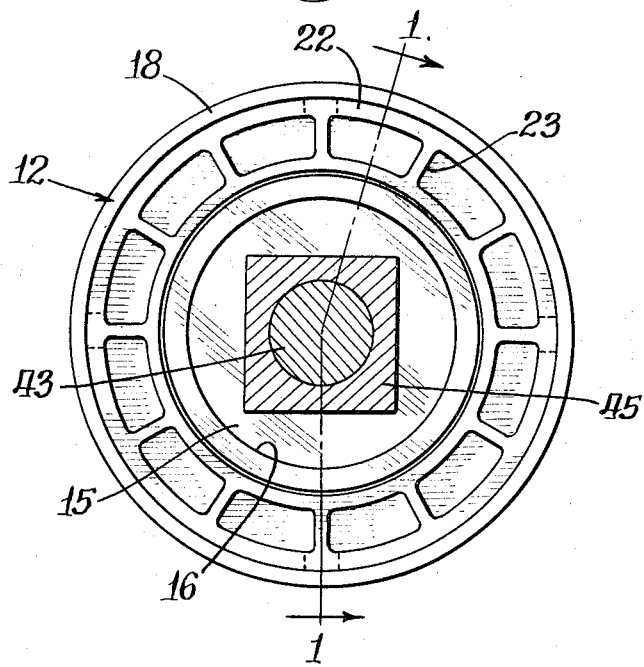

The electromagnetic clutch herein illustrated comprises a stationary field indicated generally by reference numeral 11, a rotor indicated generally by reference numeral 12 and an armature indicated generally by reference numeral 13. The rotor 12 is a three-part unitary assembly made up of a hollow cylindrical inner portion 14 of magnetic material with a radially extending flange 15 at one end having an inwardly extending annular recess 16 in its outer surface. Adjacent its other end, the cylindrical inner portion 14 is provided with a peripheral groove 17. The second part of the rotor 12 consists of an outer collar portion 18 also of suitable magnetic material with an axially outer part aligned with the radial flange 15 and having an inner interrupted circular rib 19, and an axially inner part 21. Completing the rotor 12 is a thin-walled connecting member 22 of non-magnetic bearing material which is injection-molded with the cylindrical portion 14 and outer collar portion 18 to secure those portions together in radially spaced relation as a unitary assembly. The thin-walled character of member 22 may be enhanced by a plurality of peripherally spaced recesses 23 in its outer end surface which also facilitate its molding, since the mold projections defining them function to assure proper concentric disposition of the outer collar portion 18 relative to the inner cylindrical portion 14. An axially extending portion of the connecting member 22 covers the peripheral surface of the cylindrical portion 14 axially inwardly from the peripheral groove 17 to provide a cylindrical bearing surface 24. The inner end surface of the connecting member 22 may be relieved or stepped if desired, as illustrated in FIG. 1, and it defines a radial bearing surface 25 which, with the cylindrical bearing surface 24, cooperates with the field 11. The material preferably employed for the injection molding of this thin-walled connecting member 22 is acetal homopolymer containing fibers of flurocarbon resin, such as that manufactured by E.I. du Pont de Nemours & Co., under their trademark DELRIN AF.

The stationary field 11 comprises a coil housing 26 of magnetic material having a bore 27 slidably and rotatably mounted upon the cylindrical bearing surface 24 of the rotor 12. The outer peripheral surface of the housing 26 is reduced at its inner end portion to provide a recess 28 which receives the axially inner part 21 of the outer collar portion 18 in closely spaced relationship, the collar 18 and coil housing 26 having the same outer diameters. The housing 26 defines an annular coil-receiving recess open at one end and closed at the other end by a radial end wall 29 having an aperture 31 therethrough. That coil-receiving recess is defined by inner and outer axial flanges 32 and 33 of the coil housing 26, and the outer surface of the inner axial flange 32 may be provided near the open end of the coil-receiving recess with a peripheral groove 34.

Slidable axially into the housing 26 is a bobbin 35 of non-magnetic plastic, such as nylon, which may have an inner annular rib 36 for frictionally engaging in the groove 34 to retain the bobbin in the housing. A toroidal coil 37 is wound upon the bobbin 35 in well known manner with leads 38 therefrom extending through a tubular offset extension 39 of the bobbin 35 which protrudes through the aperture 31 in the radial end wall 29 of housing 26. That extension 39 functions as a lead wire strain relief, and it also cooperates with a stationary frame member 41 to prevent rotation of the field 11. The field 11 is retained on the rotor 12 by means of a snap ring 42 engaging the peripheral groove 17.

The rotor 12 is mounted on a drive shaft 43 and, in the illustrated embodiment, is secured in any suitable manner thereto. For example, this may be accomplished by roughening a portion of the shaft, as by knurling at 43a (FIG. 1), and pressfitting the rotor thereon. Also mounted on the shaft 43 is a gear 44 which, in the illustrated embodiment, is rotatable on the shaft and is provided with a hub having a noncircular or square extension 45. The armature 13 comprises a disc of magnetic material having a central noncircular aperture 46 slidably engaging the gear hub extension 45. The armature 13 thus has axially slidable and non-rotatable engagement with the gear 44 which, in the illustrated embodiment, comprises the driving member, with the shaft 43 being the driven member. It will be understood, of course, that these driving and driven functions may be reversed with the shaft being the drive member.

When the coil 37 is energized by passing a suitable electric current through it, a flux path is generated which is outlined by the broken lines 47 in FIG. 1 and which magnetically attracts the armature 13 into engagement with rotor 12 to clutch the shaft 43 and gear 44 together. The armature and rotor remain in driving engagement until the coil is deenergized. Suitable spring means (not shown) may be interposed or connected between the armature 13 and the gear 44 to normally urge the armature to its disengaged or unclutched position of FIG. 1 and, if desired, axially slidable interengagement between the armature and the gear also may be provided by means of a peripheral slot 48 in the armature disc 13 and a finger 49 extending axially from the gear 44 engageable therein. The flux path, as illustrated at 47 in FIG. 1, is not interfered with by the thin-walled connecting member 22 nor the very slight spacing between the outer portion of the field housing 26 and the axially inner part 21 of the rotor 12 overlying it.

As will be appreciated from the foregoing, a simplified and compact electromagnetic clutch is provided which effects outstanding savings in costs of manufacturing and assembling the parts while assuring highly efficient and long lived operation. After mounting the rotor 12 on the shaft 43, the only retaining means required to maintain the field 11 thereon is the snap ring 42. The arrangement of the bobbin extension 39 through the aperture 31 of the coil-receiving housing 26 is particularly helpful in relieving the coil leads 38 of any strain and it comprises an extremely simple means for preventing rotation of the field. The thin-walled connecting member 22 not only simplifies the assembly of the inner and outer portions of the rotor but, at the same time, provides both radial and cylindrical bearing surfaces. If desired, the bore of the field housing 26 may be axially stepped to reduce the surface area thereof engaging the cylindrical bearing portion of the rotor.

It is thought that the invention and many of its attendant advantages will be understood from the foregoing description, and it will be apparent that various changes may be made in the form, construction, and arrangement of the parts without departing from the spirit of the invention or sacrificing all of its material advantages, the form hereinbefore described and shown in the drawings being merely a preferred embodiment thereof.

I claim:

1. An electromagnetic clutch mounted on a supporting shaft, comprising a unitary rotor having a hollow cylindrical inner portion of magnetic material secured to said shaft with a radially extending flange at one end, an outer collar portion of magnetic material, and a thin-walled connecting member of non-magnetic bearing material injection molded to secure said inner and outer portions together in radially spaced relation and define a cylindrical bearing, a stationary field comprising a coil housing of magnetic material having a bore supported by said bearing and inner and outer axial flanges joined by an outer end wall to define an annular recess, a bobbin of non-magnetic plastic mounted in said recess, a toroidal coil wound on said bobbin, and an armature disc movable axially into contact with said rotor in response to energization of said coil; and a drive member rotatably mounted on said shaft and having relative axially slidable and non-rotatable engagement with said armature disc.

2. An electromagnetic clutch according to claim 1, wherein said cylindrical inner portion of said rotor is provided with a peripheral groove, and a snap ring mounted in said groove to prevent axial separation of said field from said rotor.

3. An electromagnetic clutch according to claim 2, wherein said shaft is provided with a knurled portion and said rotor is press-fitted onto said knurled portion of said shaft to comprise, with said snap ring, the sole means for connecting said field and said rotor as a unit on said shaft.

4. An electromagnetic clutch according to claim 1, wherein said injection-molded bearing material is an acetal homopolymer.

5. An electromagnetic clutch according to claim 1, wherein said injection-molded connecting member also defines a radial bearing for engaging the axially inner end of said field coil housing.

6. An electromagnetic clutch according to claim 1, wherein said outer end wall of said coil housing is provided with an aperture and said bobbin is provided with a tubular offset extension through said aperture accommodating leads from said coil and functioning as a lead wire strain relief.

7. An electromagnetic clutch according to claim 6, wherein said offset extension on said bobbin comprises means for preventing rotation of said field with said rotor.

8. An electromagnetic clutch according to claim 1, wherein the outer surface of said inner axial flange of said coil housing is provided with a peripheral groove, and said bobbin is provided with an inner annular rib which frictionally engages in said groove to maintain engagement of said bobbin in said annular recess of said housing.

9. An electromagnetic clutch according to claim 1, wherein said outer collar portion of said rotor is provided with an axially outer part aligned with said radially extending flange and an axially inner part overlying the inner end of said field housing.

10. An electromagnetic clutch according to claim 9, wherein the major portion of said field housing and said rotor have the same outer diameter, and said inner end of said field housing is peripherally reduced to provide clearance for said axially inner part of said rotor collar portion.

11. An electromagnetic clutch according to claim 1, wherein the bore of said field coil housing is axially stepped to reduce the surface area thereof engaging said cylindrical bearing of said rotor.

* * * * *